United States Patent [19]

Chiang

[11] Patent Number: 4,917,265

[45] Date of Patent: Apr. 17, 1990

[54] AUTOMATIC LIQUID DISPENSER

[76] Inventor: Meng C. Chiang, 4Fl., No. 19, Lane 60, Chung Hua Rd., Hsin-Tien City, Taipei Hsien, Taiwan

[21] Appl. No.: 190,115

[22] Filed: May 4, 1988

[51] Int. Cl.⁴ .............................................. B67D 5/08
[52] U.S. Cl. ..................................... 222/52; 222/207; 141/361
[58] Field of Search ..................... 222/52, 54, 63, 181, 222/207, 214, 212–213, 333, 372, 380; 141/351, 361, 98; 137/509

[56] References Cited

U.S. PATENT DOCUMENTS

| | | | |
|---|---|---|---|
| 3,273,752 | 9/1966 | Horeczky | 222/52 |
| 3,327,901 | 6/1967 | Yerkovich | 222/52 |
| 3,434,628 | 3/1969 | Ceraldi | 222/52 |
| 3,576,277 | 4/1971 | Blackmon | 222/1 |
| 4,561,571 | 12/1985 | Chen | 222/207 |
| 4,645,094 | 2/1987 | Acklin et al. | 222/504 X |
| 4,722,372 | 2/1988 | Hoffman et al. | 141/98 |

Primary Examiner—Michael S. Huppert

[57] ABSTRACT

A liquid dispenser is provided which includes a housing for retaining a quantity of a dispensing liquid. A base tray in association with a lower face of the housing defines a chamber for installation of a sensor and a valve controller. The valve controller which is responsive to the sensor includes a cylinder for transferring liquid from the housing to an external part of the housing. The cylinder is formed with a plurality of horizontal panels as well as a branch sleeve functionally connected to the sensor and a vertically located hollow sleeve-like movable plug having a circumferential flange on a central face with a downwardly extending protrusion formed on a lower portion within the cylinder. The movable plug is connectable to a rubber plug having a vent. The rubber plug is engageable with a bushing when the movable plug is moving downward and disengageable with the bushing when the movable plug is moving upward, so as to open and close the dispenser automatically and dispense only a predetermined amount of liquid.

4 Claims, 4 Drawing Sheets

AUTOMATIC LIQUID DISPENSER

BACKGROUND OF THE INVENTION

The present invention relates to automatic infra-red liquid dispensers, and more particularly, to an infra-red automatic liquid dispenser having no timer but which still dispenses a specific volume of liquid when utilized.

Liquid dispensers, such as liquid soap dispensers, lotion dispensers, are commonly employed in public lavatories. In particular, automatic liquid dispensers with infra-red sensor are convenient for their completely automatic performance. When one's hands are put under the liquid dispenser, the infra-red sensor senses the signal and induces a signal to a relay so as to open the dispenser and a fixed quantity of liquid thereby drops down.

In practice, the liquid soap or lotion dispensed from the dispenser should be limited to a specific quantity. Therefore, the liquid dispenser is inevitably installed with a timer, so that the motion of the relay is restricted to a specific period of time. The incorporation of a timer increases the complexity of the circuit and thereby increases the possibility of defects. The situation becomes worse when the timer per se is defective so that the dispenser may not be opened and closed as desired.

SUMMARY OF THE INVENTION

It is therefore a primary objective of the present invention to provide a liquid dispenser having infrared sensor, which provides a specific quantity of liquid each time without the utilization of timer.

Another objective of the present invention is to provide a liquid dispenser having a novel mechanical structure to perform a function similar to a timer.

A further objective of the present invention is to provide a liquid dispenser which simplifies the electrical circuit of the circuit board by obviating the need to use a timer.

These and other objectives of the present invention, which will be apparent from a careful reading of the specification provided hereinbelow with reference to the accompanying drawings, are achieved by a liquid dispenser comprising:

an openable housing for retaining a quantity of a dispensing liquid, including an outlet at a lower face thereof which is composed of a plurality of holes, and a downwardly extending prong on the lower face of the outlet, said prong being encompassed by a spring member;

a base tray mounted to a lower face of said housing defining a chamber for installation of a sensor means and a valve control means, said base tray incorporating an outlet port disposed on a lower face thereof;

said sensor means substantially sensing an infrared signal, said sensor means including a relay and a circuit board, the relay includes an axle rod for actuating the valve control means;

said valve control means which is responsive to said sensor means comprising:

a cylinder for transferring liquid from the housing to an outside area of said dispenser;

a plurality of horizontal panels extending from the inner wall of the cylinder toward the central portion thereof;

a horizontally extending branch sleeve integrally connected with said cylinder being functionally connected to an axle rod of said sensor means for operation in response to said sensor means;

a vertically located hollow sleeve-like movable plug having a circumferential flange on a central face and a downwardly extending protrusion on a lower part thereof within said cylinder, said movable plug being connectable to a rubber plug having vent therein, said rubber plug being engageable with a bushing when said movable plug is urged downward and disengageable with the bushing when said movable plug is urged upward;

said spring member urging the rubber plug of the movable plug to engage with the bushing such that the opening of the bushing is sealed so as to close the dispenser and dispensing liquid flowing through the sector-shaped holes of the outlet and the opening defined by the sector-shaped panels so as to fill the internal cavity of the cylinder and the branch sleeve;

said sensor means sensing an infra-red signal to actuate the relay, and the axle rod thereof pressing the rubber sleeve, thereby urging the movable plug upward until the flange thereof contacting with the sector-shaped panels of the cylinder and the dispenser is opened; the flange of the movable plug sealing the central opening defined by the panels of the cylinder such that the liquid retained in the upper part of the cylinder does not flow down any further, and the dispenser is opened and dispenses a predetermined amount of dispensing liquid.

DETAILED DESCRIPTION OF THE PREFERRED EMBODIMENT

Figure 1:
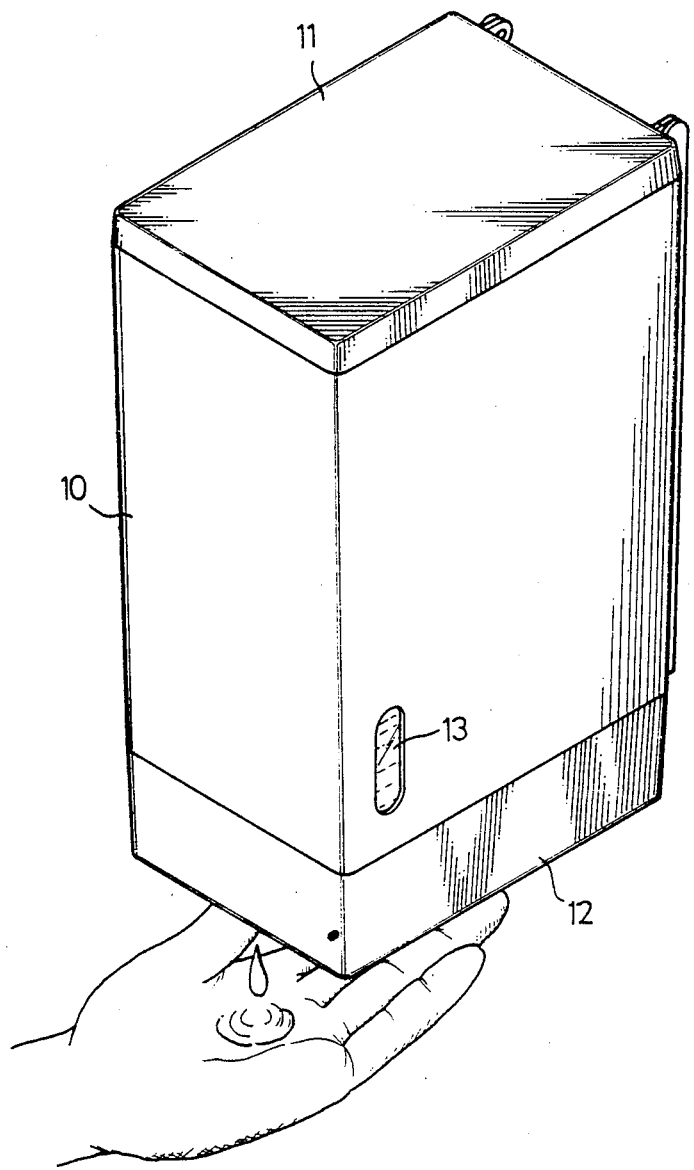
FIG. 1 is a perspective view of a liquid dispenser in accordance with the present invention.

Referring to the drawings and initially to FIG. 1, it can be seen that a liquid dispenser in accordance with the present invention comprises a housing 10 for retaining liquid, such as liquid soap, lotion, or the like, an upper lip 11 covering said housing 10 when closed or serving as an opening for introducing the desired liquid, and a base tray 12 associated with said housing 10 for installation of a sensor means and a valve control means, which will be described more fully hereinbelow.

Although not limited thereto, it is preferable that the housing 10 is provided with a window 13 furnished with transparent glass or plastic for the observation of content of liquid in the housing 10.

Figure 2:
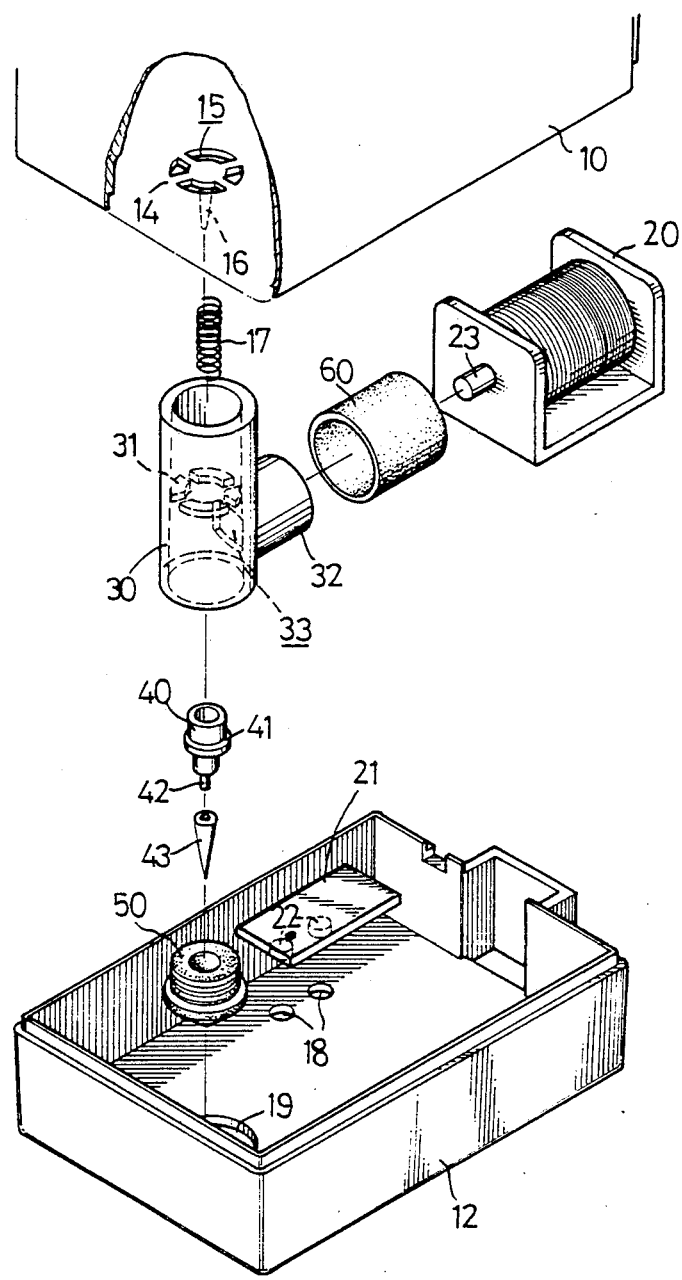
FIG. 2 is an exploded view of the liquid dispenser illustrating the elements inside the liquid dispenser, a portion of which being cut away to reduce the expansion thereof.

Referring to FIG. 2, the housing 10 has an outlet 14 on its lower face for supplying liquid to the valve control means, preferably the outlet 14 is composed of a plurality of holes. Specifically, four sector-shaped holes 15 are provided, as shown in the drawings. A downwardly extending prong 16 encompassed by a spring member 17 is formed on the lower face of the outlet 14.

Also referring to FIG. 2, it can be seen that the base tray 12 is in compliance with the structure of the housing 10 so as to combine therewith. The base tray 12 includes a pair of holes 18 and an outlet port 19.

The sensor means is composed of a relay 20 and a circuit board 21, the valve control means is composed of a cylinder 30, a movable plug 40, a bushing 50, and a rubber sleeve 60.

The circuit board 21 has a pair of transceivers 22 for detecting or sensing the outer condition, each passes through respective holes 18 formed on the base tray 12. If the transceivers 22 sense any infra-red ray, the circuit board 21 will induce a flow of current and the relay 20 having an axle rod 23 will be actuated. The relay 20 and circuit board 21 associated therewith are old and well know in the art and need not be described in further detail.

The valve control means is installed in the base tray 12 at a position responsive to the outlet 14 of the housing 10. In one embodiment, a vertically located cylinder 30 is provided on the base tray 12 with one of its end openings in conjunction with the outlet 14 of the housing and the other end opening in conjunction with the outlet port 19 of the base tray 12, for transferring liquid in the housing 10 to the external so as to reach a user. A plurality of horizontal panels extending from the inner wall of the cylinder 30 toward the central part of the cylinder 30 are formed in the cylinder 30. Preferably, four sector-shaped panels 31, as depicted in the drawings, are integrally formed in the cylinder 30. The number and shape of these panels 31 correspond to the four sector-shaped holes 15 of the housing 10.

A horizontally extending branch sleeve 32 is integrally connected with the cylinder 30, and an opening 33 is formed in the surface of the cylinder 30 towards the branch sleeve 32. Another end of the branch sleeve 32 is connected to a rubber sleeve 60. The rubber sleeve 6 is in turn connected to the axle rod 23 of the relay 20 for operation in response to the relay 20 and the circuit board 21 toward the existance of infra-red ray.

The movable plug 40 is a vertical hollow sleeve having a circumferential flange 41 and a downwardly extending protrusion 42 on a lower face thereof. The movable plug 40 is connected to a rubber plug 43 having a vent therein.

The bushing 50 is provided on the outlet port 19 of the base tray 12. The rubber plug 43 is engageable with the bushing 50 when the movable plug 40 is urged downward and disengageable with the bushing 50 when the movable plug 40 is urged upward.

Figure 3:
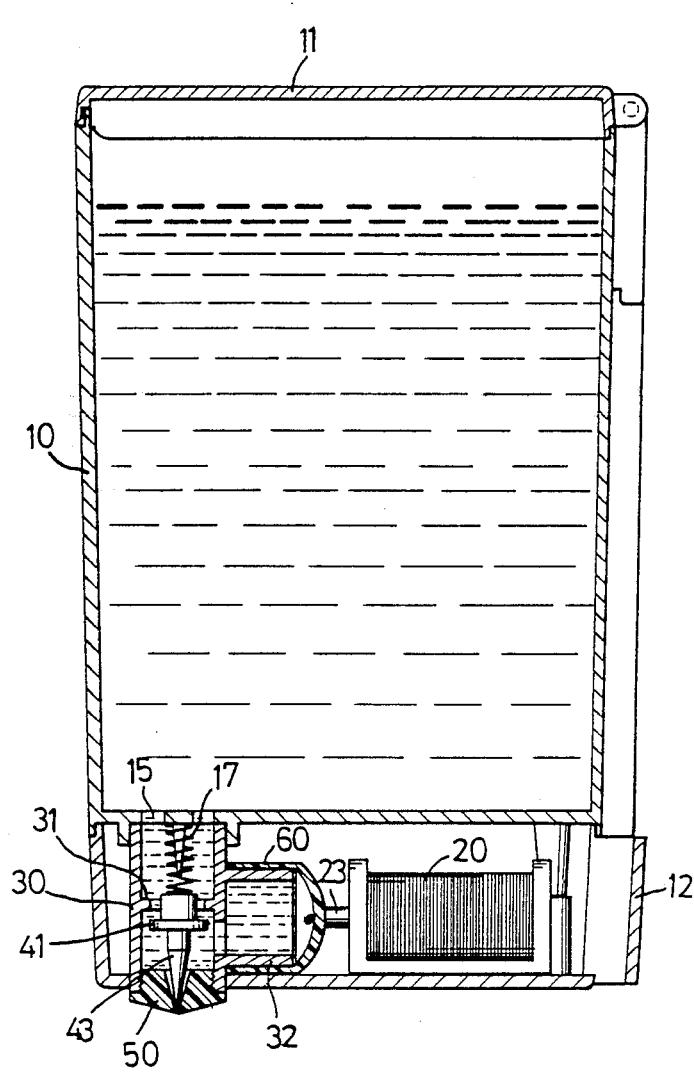
FIG. 3 is a cross-sectional view taken along line 3—3 of FIG. 1, illustrating the spacial relation of the elements in the liquid dispenser and the valve in closed position.
Figure 4:
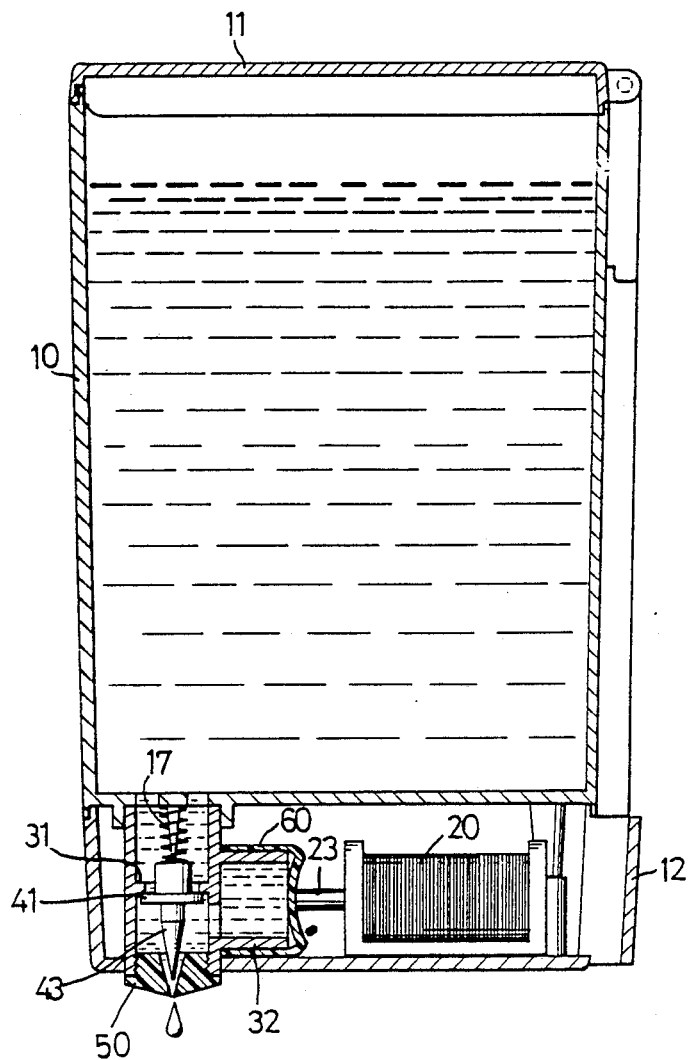
FIG. 4 is a cross sectional view similar to FIG. 3, but illustrating the valve in opened position.

The internal feature of each component after assembly and the operation of the dispenser is depicted most clearly in FIGS. 3 and 4.

The tension of the spring member 17 which encompasses the prong 16 causes the rubber plug 43 of the movable plug 40 to engage with the bushing 50 such that the opening of the bushing 50 is sealed. Accordingly, the dispenser remains normally closed. On the other hand, dispensing liquid flows through the sector-shaped holes 15 of the outlet 14 and the opening defined by the sector-shaped panels 31, and fills the internal cavity of the cylinder 30 and the branch sleeve 32.

When the transceivers 22 sense an infra-red signal, the relay 20 is actuated and the axle rod 23 thereof presses the rubber sleeve 60 and the space inside the cylinder 30 is reduced, the liquid therein is therefore pressurized. Therefore, the liquid exerts an upward force. The upward force thus formed thereby urges the movable plug 40 upward until the flange 41 thereof contacts with the sector-shaped panels 31 of the cylinder 2. As can be seen in FIG. 4, the bushing 50 is not longer sealed. That is to say, the dispenser is opened.

It is important to note that the flange 41 of the movable plug 40 contacts with the sector-shaped panels 31 of the cylinder 20 so as to seal the central opening defined by the sector-shaped panels 31 such that the liquid retained in the upper part of the cylinder 30 does not flow down any further; i.e., the liquid under the panels 31 of the cylinder 30 cannot be refilled. Therefore, the dispenser is opened and dispenses a fixed amount of dispensing liquid.

When the dispensing liquid is dispensed out to a certain degree, the upward force exerted by the liquid toward the movable plug 40 decreases. When the upward force is smaller than the spring force exerted by the spring member 17, then the movable plug 40 again drops down and seals the opening. In other words, said movable plug 40 seals the opening automatically, when a fixed amount of fluid is dispensed.

While the invention has been explained in relation to its preferred embodiments, it is to be understood that various modifications or alterations thereof will become apparent to those skilled in the art upon reading this specification. Therefore, it is to be noted that all such modifications or alterations are considered as fall within the scope of the appended claims.

I claim:
1. A liquid dispenser comprising:
   an openable housing for retaining a quantity of a dispensing liquid, including an outlet at a lower face thereof which is composed of a plurality of holes, and a downwardly extending prong on the lower face of the outlet, said prong being encompassed by a spring member;
   a base tray mounted to a lower face of said housing defining a chamber for installation of a sensor means and a valve control means, said base tray incorporating an outlet port disposed on a lower face thereof;
   said sensor means substantially sensing a need for dispensing liquid, including a relay and a circuit board, the relay including an axle rod for actuating the valve control means;
   said valve control means which is responsive to said sensor means comprising:
   a cylinder for transferring liquid from the housing to an external part of the housing;
   a plurality of horizontal panels extending from the inner wall of the cylinder toward the central portion of the cylinder;
   a horizontally extending branch sleeve integrally connected with said cylinder, the branch sleeve being functionally connected to the axle rod of said sensor means through a rubber sleeve for operation in response to said sensor means;
   a vertically located hollow sleeve-like movable plug having a circumferential flange on a central face and a downwardly extending protrusion on a lower part thereof within said cylinder, said movable plug being connectable to a rubber plug having a vent therein, said rubber plug being engageable with a bushing when said movable plug is urged downward and disengageable with the bushing when said movable plug is urged upward;
   said spring member urging the rubber plug to engage with the bushing such that the opening of the bush- ing is sealed to close the dispenser, and liquid is allowed to flow through the sector-shaped holes of the outlet and the opening defined by said plurality of horizontal panels to fill the internal cavity of the cylinder and the branch sleeve;

said sensor means sensing an infra-red signal to actuate the relay, and the axle rod thereof pressing the rubber sleeve, thereby urging the movable plug upward until the flange thereof contacts with the sector-shaped panels of the cylinder opening the dispenser; the flange of the movable plug sealing the central opening defined by the panels of the cylinder such that the liquid retained in the upper part of the cylinder cannot flow down any further, and the dispenser is opened and dispenses a predetermined amount of dispensing liquid.

2. A liquid dispenser as claimed in claim 1, wherein said housing further includes an upper lid for covering said housing when closed or serving as an inlet for filling the desired dispensing liquid.

3. A liquid dispenser as claimed in claim 1, wherein said base tray further comprises a pair of holes on the lower face thereof.

4. A liquid dispenser as claimed in claim 3, wherein said circuit board has a pair of transceivers for detecting the outer condition, each transceiver passes through a respective hole formed on said base tray.

* * * * *